(12) United States Patent
Jin et al.

(10) Patent No.: US 9,705,708 B1
(45) Date of Patent: Jul. 11, 2017

(54) INTEGRATED CIRCUIT WITH CONTINUOUSLY ADAPTIVE EQUALIZATION CIRCUITRY

(71) Applicant: Altera Corporation, San Jose, CA (US)

(72) Inventors: Wenyi Jin, San Jose, CA (US); Jihong Ren, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 15/170,751

(22) Filed: Jun. 1, 2016

(51) Int. Cl.
*H03H 7/30* (2006.01)
*H04L 25/03* (2006.01)

(52) U.S. Cl.
CPC .. *H04L 25/03057* (2013.01); *H04L 25/03885* (2013.01)

(58) Field of Classification Search
CPC ............. H04L 25/03885; H04L 25/063; H04L 25/03019; H04L 27/01; H04L 2025/0349; H04L 2025/03503; H04L 2025/03592; H04L 25/03878; H04L 2025/03611; H04L 25/03006; H04L 25/08; H04L 27/2647; H03G 5/165
See application file for complete search history.

(56) References Cited

U.S. PATENT DOCUMENTS

| | | | |
|---|---|---|---|
| 5,283,811 A | 2/1994 | Chennakeshu et al. | |
| 7,170,438 B2 | 1/2007 | Jaussi et al. | |
| 7,443,913 B2 | 10/2008 | Bhakta et al. | |
| 7,924,912 B1 | 4/2011 | Rokhsaz et al. | |
| 8,396,110 B1 | 3/2013 | Hsieh | |
| 8,401,065 B2 | 3/2013 | Hidaka et al. | |
| 8,626,474 B2 | 1/2014 | Li et al. | |
| 8,638,150 B2 | 1/2014 | Kim et al. | |
| 8,817,867 B1 | 8/2014 | Annampedu et al. | |
| 8,861,583 B2 | 10/2014 | Liu | |
| 8,879,618 B2 | 11/2014 | Abdalla et al. | |
| 8,958,512 B1 * | 2/2015 | Ding | H04L 25/03057 375/229 |
| 9,143,371 B1 * | 9/2015 | Warner | H04L 25/03057 |
| 9,177,087 B1 | 11/2015 | Shimanouchi et al. | |

(Continued)

OTHER PUBLICATIONS

Chan et al., U.S. Appl. No. 14/536,417, filed Nov. 7, 2014.

*Primary Examiner* — Khanh C Tran
(74) *Attorney, Agent, or Firm* — Treyz Law Group, P.C.; Jason Tsai

(57) ABSTRACT

An integrated circuit for supporting a high-speed communications link is provided. The integrated circuit may include equalization circuitry having a continuous time linear equalizer (CTLE) circuit, a decision feedback equalizer (DFE) circuit, and associated adaptation logic for controlling the CTLE circuit and the DFE circuit. The adaptation logic may include an error minimization adaptation circuit operable to generate at least a first post-cursor value, a signal amplitude detection circuit operable to generate a main cursor value, and a CTLE adaptation circuit configured to compute a ratio between the first post-cursor value and the main cursor value. The CTLE adaptation circuit may compare the computed ratio to predetermined values to determine whether or not to adjust the peaking gain of the CTLE circuit to help minimize inter-symbol interference for signals traveling through the high-speed communications link.

20 Claims, 9 Drawing Sheets

(56) References Cited

U.S. PATENT DOCUMENTS

| | | | |
|---|---|---|---|
| 9,203,604 B1 | 12/2015 | Mendel et al. | |
| 9,210,008 B2 | 12/2015 | Rane | |
| 9,240,912 B1 | 1/2016 | Giridharan et al. | |
| 9,264,276 B1* | 2/2016 | Chan | H04L 27/2647 |
| 9,397,824 B1* | 7/2016 | Hoshyar | H04L 7/0331 |
| 9,397,867 B1* | 7/2016 | Azenkot | H04L 25/03019 |
| 9,450,788 B1* | 9/2016 | Cops | H04L 25/03057 |
| 2002/0050861 A1 | 5/2002 | Nguyen et al. | |
| 2005/0030085 A1 | 2/2005 | Jankowski et al. | |
| 2007/0229158 A1 | 10/2007 | Mojarradi et al. | |
| 2009/0020517 A1 | 1/2009 | Ito et al. | |
| 2009/0316769 A1 | 12/2009 | Hidaka et al. | |
| 2011/0187410 A1 | 8/2011 | Kato et al. | |
| 2012/0062316 A1 | 3/2012 | Huang et al. | |
| 2012/0141122 A1 | 6/2012 | Carusone et al. | |
| 2012/0230384 A1* | 9/2012 | Chiba | H04L 25/03057 375/233 |
| 2013/0077669 A1* | 3/2013 | Malipatil | H04L 25/03019 375/233 |
| 2013/0114665 A1* | 5/2013 | Aziz | H04L 25/03057 375/233 |
| 2014/0140389 A1 | 5/2014 | Chen | |
| 2014/0169426 A1* | 6/2014 | Aziz | H04L 25/03057 375/224 |
| 2014/0255037 A1* | 9/2014 | Shang | H04L 27/01 398/115 |
| 2014/0269889 A1 | 9/2014 | Xu et al. | |
| 2014/0281845 A1 | 9/2014 | Cyrusian | |
| 2014/0312945 A1 | 10/2014 | Ippili et al. | |
| 2014/0355663 A1 | 12/2014 | Kizer et al. | |

* cited by examiner

INTEGRATED CIRCUIT WITH CONTINUOUSLY ADAPTIVE EQUALIZATION CIRCUITRY

BACKGROUND

This relates generally to communications links, and more particularly, to high-speed input-output (I/O) communications links.

A typical communications link includes a transmitter (TX) module, a receiver (RX) module, and a channel that connects the TX module to the RX module. The TX module transmits a serial data bit stream across the channel to the RX module. Typical high-speed transmit data rates can be as high as 10 Gbps (gigabits per second) or more. Communications links operating at such high data rates are often referred to as high-speed serial links or high-speed I/O links.

Oftentimes, the RX module includes equalization circuitry having a continuous time linear equalizer (CTLE) and a decision feedback equalizer (DFE) that are used to provide equalization for analog signals which may have been degraded from being transmitted through a band limited channel. The CTLE is typically used to provide high frequency boosting to help cancel both pre-cursor and post-cursor long-tail inter-symbol interference. The DFE typically uses a feedback finite impulse response (FIR) filter to directly subtract out only post-cursor inter-symbol interference. Since both the CTLE and the DFE circuits perform similar functions, it may be desirable to minimize the interaction between these two circuits to avoid overcompensation.

In one conventional arrangement, the CTLE circuit is first activated during a first phase during which the DFE circuit is disabled. Once the CTLE circuit is properly initialized, the CTLE settings is fixed, and the DFE circuit can then be enabled to perform dynamic equalization during a second phase. Performing sequential equalization in two phases in this way, however, may not be optimal since the CTLE circuit does not continuously adapt to the behavior of incoming signals during the second phase.

It is within this context that the embodiments described herein arise.

SUMMARY

This relates generally to integrated circuits and more particularly, to integrated circuits that are used for supporting high-speed communications links. Such types of integrated circuits may include a continuous time linear equalizer (CTLE) circuit and a decision feedback equalizer (DFE) circuit connected in series. A variable gain amplifier (VGA) may optionally be interposed between the CTLE and the DFE equalizers to adjust the DC gain.

The CTLE and DFE circuits may be continuously adjusted using digital adaptation logic. The adaptation logic may include an error minimization adaptation circuit (e.g., a sign-sign LMS based error minimization circuit), a signal amplitude detection circuit, and a CTLE adaptation circuit. The error minimization adaptation circuit may be used to obtain post-cursor values, whereas the signal amplitude detection circuit may be used to obtain a main cursor value. The CTLE adaptation circuit may receive the main cursor value from the signal amplitude detection circuit and only a subset of the post-cursor values from the error minimization adaptation circuit.

In particular, the CTLE adaptation circuit may receive only the first post-cursor value. The CTLE adaptation circuit may include ratio compare logic, a filtering circuit, and a CTLE code updater. The ratio compare logic may be used to compute a ratio between the main cursor value and the first post-cursor value and to compare the computed ratio to upper and lower limits of a predetermined operating range. The filtering circuit may optionally filter the output from the ratio compare logic. The CTLE code updater may receive filtered signals from the filtering circuit to continuously control peaking gain settings of the CTLE circuit.

Further features of the invention, its nature and various advantages will be more apparent from the accompanying drawings and following detailed description.

DETAILED DESCRIPTION

This relates to communications links and more particularly, to integrated circuits with equalization circuitry. The equalization circuitry may include a continuous time linear equalizer (CTLE) circuit and a decision feedback equalizer (DFE) circuit. The CTLE and the DFE circuits may be dynamically controlled using an associated adaptation logic block.

The adaptation logic block may be used to provide tap weights to the DFE circuit and may also be used to identify a main cursor and a first post-cursor of a pulse response at the output of the DFE circuit. The ratio of the first post-cursor to the main cursor may be computed and compared to predetermined limits. Continuous adaptation of the CTLE circuit can be performed based on the comparison results. Operated in this way, the CTLE adaptation is effectively decoupled from the DFE adaptation while helping to further reduce DFE error propagation.

It will be recognized by one skilled in the art, that the present exemplary embodiments may be practiced without some or all of these specific details. In other instances, well-known operations have not been described in detail in order not to unnecessarily obscure the present embodiments.

Communications links are commonly used to transport data between separate integrated circuits packages, printed circuit boards, components, systems, etc. Such communications links may be used to connect integrated circuits that include communications capabilities, such as memory chips, digital signal processing circuits, microprocessors, application specific integrated circuits, programmable logic device integrated circuits, field-programmable gate arrays, application specified standard products, or any other suitable integrated circuit.

Figure 1:
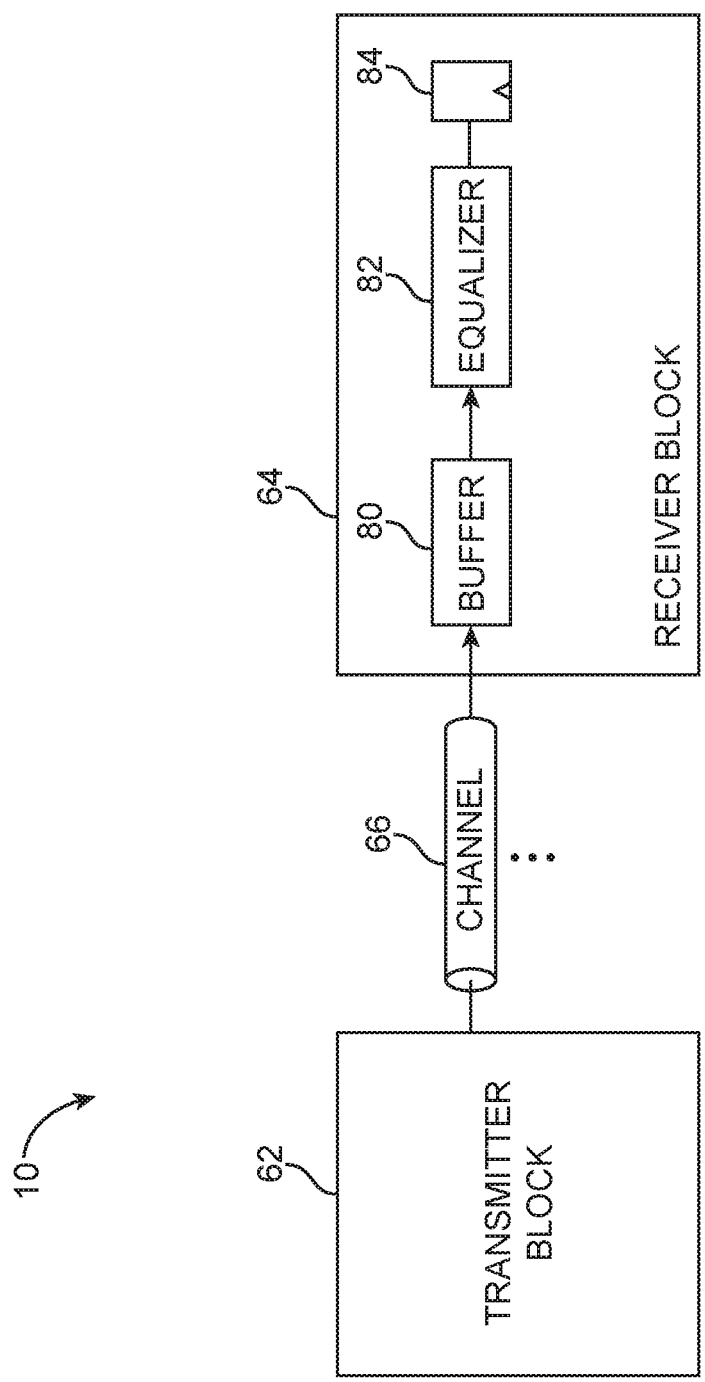
FIG. 1 is a diagram of an illustrative communications link in accordance with an embodiment.

A high-speed link might, as an example, carry data at 10 gigabits per second or more. A high-speed communications system 10 is shown in FIG. 1. Communications system 10 may include transmitter (TX) circuitry such as TX block 62, a channel such as channel 66, and receiver (RX) circuitry such as RX block 64. Channel 66 may connect TX block 62 to RX block 64 (e.g., transmitter 62 may produce data that is to be transmitted to receiver 64 over link 66).

TX circuitry 62 may be formed on a first integrated circuit while RX circuitry 64 may be formed on a second integrated circuit (as an example). Integrated circuit devices 62 and 64 may be mounted on a printed circuit board (PCB). Transmitter block 62 may convey data to RX block 64 through channel 66. If desired, more than one channel may be used to link TX block 62 to RX block 64.

In general, channel 66 may be formed from any suitable physical transmission medium. Examples of transmission paths that may be used in channel 66 include traces on printed circuit boards, differential signaling paths made up of pairs of conductive wires, coaxial cable paths (e.g., a CAT 5 cable), fiber optic cable paths, combinations of such paths, backplane connectors, or other suitable communications link paths. In a typical system, integrated circuits 62 and 64 may be mounted on one or more circuit boards and channel 66 may involve transmission line structures fabricated on the circuit board or boards.

This example is merely illustrative. Communications link of the type described in connection with FIG. 1 may be used provide data transport between integrated circuits, printed circuit boards, circuits within a single integrated circuit, systems, etc.

Receive circuitry 64 may include an RX buffer such as buffer 80, an RX equalizer such as equalizer 82, and a data latching circuit 84. In the example of FIG. 1, the second terminal of channel 66 may be connected to an input of buffer 80. Buffer 80 may receive data from channel 66. Buffer 80 may have an input differential resistance of 10 Ohms for impedance matching (i.e., assuming the second terminal of channel 66 has an output differential resistance of 10 Ohms). Buffer 80 may provide additional pre-amplification for the received data, if desired.

Buffer 80 may output the received data to equalization circuitry 82. Equalization circuitry 82 may provide further high-frequency boosting or direct signal level boosting to compensate for any undesired frequency-dependent signal loss commonly seen in high-speed serial links (e.g., losses in copper-based channels that exhibit undesired low-pass transfer characteristics that result in signal degradation at high data rates). Equalization circuitry 82 may implement linear equalization schemes such as finite impulse response (FIR) and feed forward equalization (FFE) schemes or nonlinear adaptive equalization schemes such as infinite impulse response (IIR) or decision feedback equalization (DFE) schemes (as examples).

Equalizer 82 may output the received data that has been equalized to RX data latch 84. Data latch 84 may be a serial-in parallel-out (SIPO) or a de-serializer data circuit (as an example). In this example, data source 84 may convert the serial data bit stream to parallel data for subsequent processing.

All the components of system 10 in FIG. 1 (e.g., channel 66, buffer 80, and equalizer 82) may be implemented using single-ended or differential signaling architectures. For example, equalizer 82 may have differential inputs and differential outputs instead of single-ended inputs and outputs, and the data transmitted over channel 66 may be in the form of differential signals.

Figure 2:
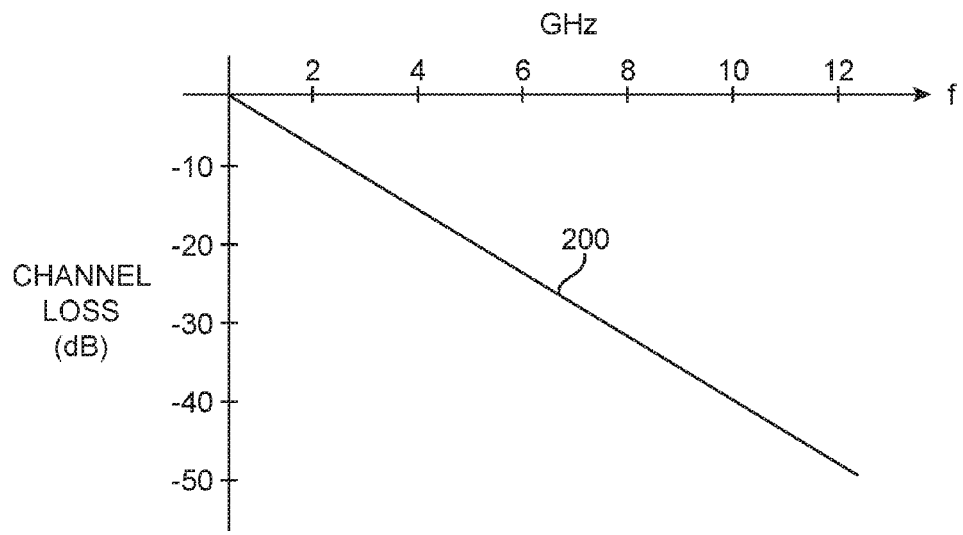
FIG. 2 is a diagram of an illustrative channel response in accordance with an embodiment.

FIG. 2 is a diagram of an illustrative channel response in accordance with an embodiment. As shown in FIG. 2, line 200 may represent the amount of channel loss (in units of dB) as a function of frequency. In general, channel loss increases with frequency (i.e., the amount of channel loss is more pronounced at higher operating frequencies). The example of FIG. 2 in which channel loss is linearly proportional to frequency is merely illustrative. In other suitable arrangements, line 200 may be non-linear.

Figure 3:
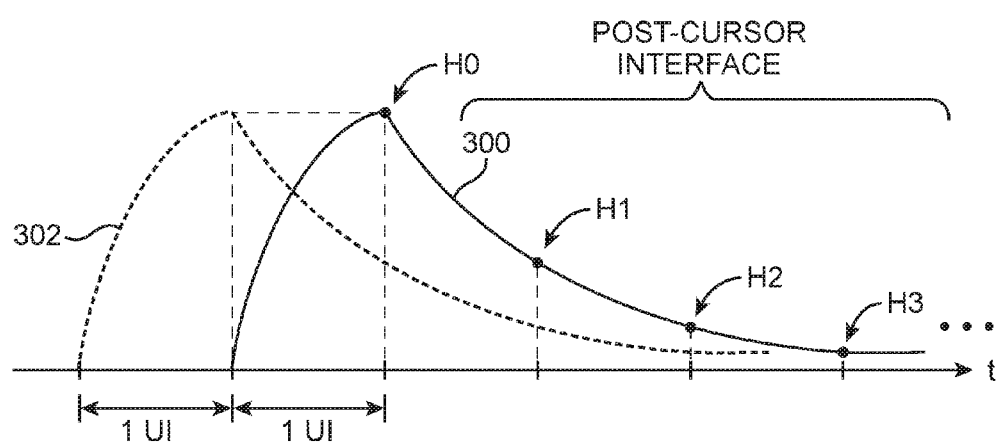
FIG. 3 is a timing diagram illustrating a pulse response and associated post-cursor interference in accordance with an embodiment.

FIG. 3 is a diagram illustrating a time-domain pulse response 300 of a signal that has propagated through a lossy channel. The width (or duration) of each pulse response is ideally one unit internal (UI), exhibiting zero rise times and zero fall times as seen in a perfect square pulse. However, due to the band-limited characteristics of the lossy channel, pulse response 300 will deviate from the perfect square pulse, often resulting in non-negligible rise times and fall times.

As shown in FIG. 3, the slow fall time of pulse response 300 will therefore "spill over" into subsequent unit intervals. The value of the current pulse response is measured by a main cursor value H0, whereas the value of subsequent contributions are measured by post-cursors H1, H2, H3, etc. Ideally, post-cursor values such as H1-H3 are as small as possible. In reality, lossy channel will also sometimes generate non-zero pre-cursor values that may spill over to previous unit intervals. The pre-cursor interference is not shown in FIG. 3 so as to not unnecessarily obscure the present embodiments.

The presence of the long tail (e.g., the non-zero post-cursor values) in a pulse response is generally undesirable. In the example of FIG. 3, a previous pulse response 302 having a long tail will contribute additional noise to the current pulse response 300, which will add to the main cursor value H0. As long as the long-tail post-cursor values are not equal to zero, all subsequent pulse responses will be affected. Error generate in this say is sometimes referred to as inter-symbol interference (ISI). Equalization circuitry 82 may generally be used to help equalize the receive signal output from a lossy channel such that the pulse response is as close to an ideal square pulse as possible.

Figure 4:
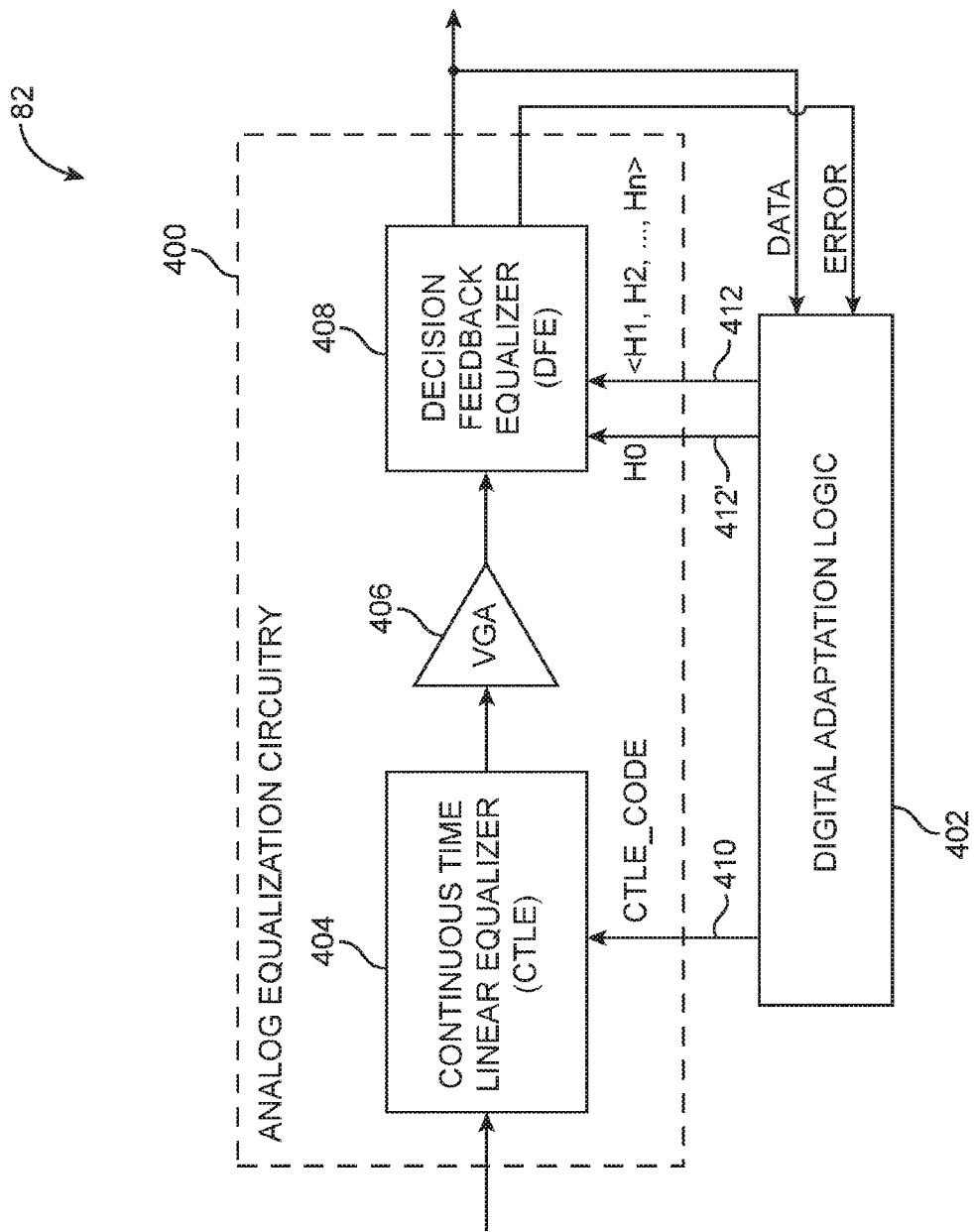
FIG. 4 is a diagram of illustrative equalization circuitry that is controlled by continuous adaptation logic in accordance with an embodiment.

FIG. 4 is a diagram of exemplary equalization circuitry in accordance with an embodiment. As shown in FIG. 4, equalization circuitry 82 may include analog equalization circuitry 400 that is controlled by digital adaptation logic 402. Analog equalization circuitry 400 may include a first equalizer such as continuous time linear equalizer (CTLE) circuit 404, a second equalizer such as decision feedback equalizer (DFE) circuit 408, and an optional amplifier such as variable gain amplifier (VGA) 406 interposed between CTLE circuit 404 and DFE circuit 408. CTLE circuit 404 may be an active or passive equalizer for providing a desired peaking gain (e.g., an adjustable gain difference between a high frequency AC gain and a low frequency DC gain), whereas DFE circuit 408 may be a non-linear equalizer that uses a digital slicer to sample the input and a feedback finite impulse response (FIR) filter to directly subtract out the post-cursor ISI from the incoming signal.

Decision feedback equalizer 408 may output a data signal and an error signal. The data and error signals may be fed to digital adaptation logic 402. Digital adaptation logic 402 may dynamically (continuously) control both CTLE circuit 404 and DFE circuit 408 during normal operation of the receiver based on the received data and error signals. In particular, digital adaptation logic 410 may output CTLE settings CTLE_CODE to CTLE circuit 404 via path 410 while outputting DFE tap amplitudes (sometimes referred to as "tap weights")<H1, H2, . . . , Hn> to DFE circuit 408 via path 412. Logic 402 may also output a main cursor value H0 to DFE 408 via path 412' so that DFE 408 can generate the error signal. Both the CTLE control signals CTLE_CODE and the DFE control signals H1-Hn may be continuously updated during operation of equalization circuitry 82 without conflicting with one another.

Figure 5:
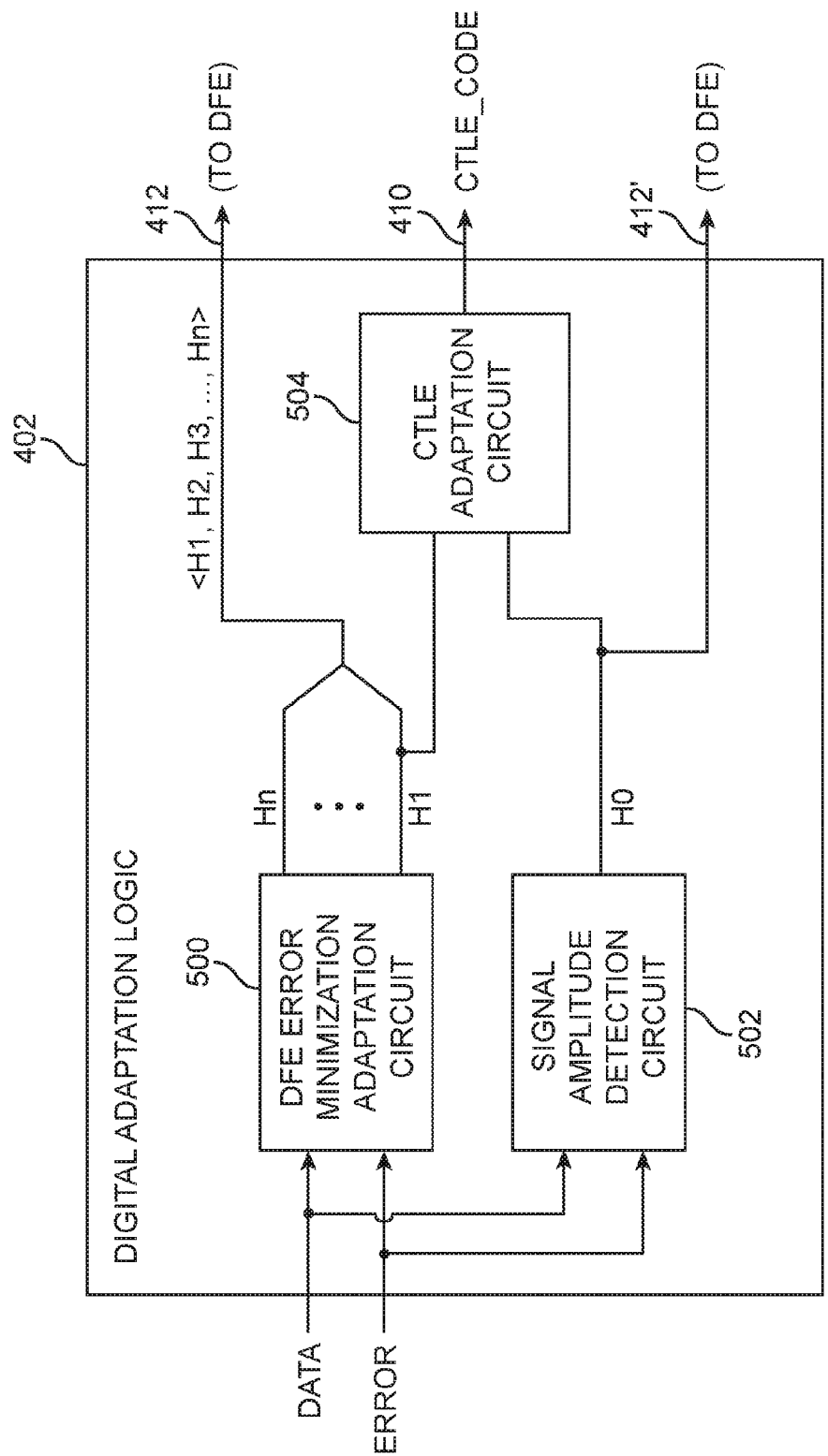
FIG. 5 is a diagram of an exemplary adaptation logic block of the type shown in FIG. 4 in accordance with an embodiment.

Details of adaptation logic block 402 are shown in FIG. 5. As shown in FIG. 5, digital adaptation logic 402 includes a DFE error minimization adaptation circuit such as circuit 500, a signal amplitude detection circuit such as circuit 502, and a CTLE adaptation circuit such as circuit 504. DFE error minimization adaptation circuit 500 may, for example, perform a sign-sign least mean square algorithm (SSLMS) or other error minimization algorithm to yield post-cursor values H1, H2, . . . , and Hn based on the data and error signal inputs. Post-cursor values <H1, H2, H3, . . . , Hn> generated in this way may be fed directly to the DFE circuit via path 412.

Signal amplitude detection circuit 502 may also receive the data and error input signals and generate a corresponding measured main cursor value H0. Measured main cursor value H0 may represent the average signal amplitude of an asserted data signal. Main cursor value H0 generated in this way may also be fed directly to the DFE circuit via path 412'.

In particular, CTLE adaptation circuit 504 within logic 402 may have a first input that receives main cursor value H0 from circuit 502 and a second input that receives the first post-cursor value H1 from circuit 500. Based on these two values alone, CTLE adaptation circuit 504 may adjust the CTLE_CODE setting on path 410, which is used to control the CTLE circuit. In accordance with an embodiment, the CTLE_CODE may be adjusted based on the ratio between values H0 and H1 (e.g., based on the ratio of H0 to H1, or H1 to H0). This is merely illustrative and does not serve to limit the scope of the present invention. If desired, additional post-cursor values H2, H3, and/or other post-cursor values may also be fed to CTLE adaptation circuit 504 for use in determining whether or not to adjust CTLE_CODE.

Figure 6:
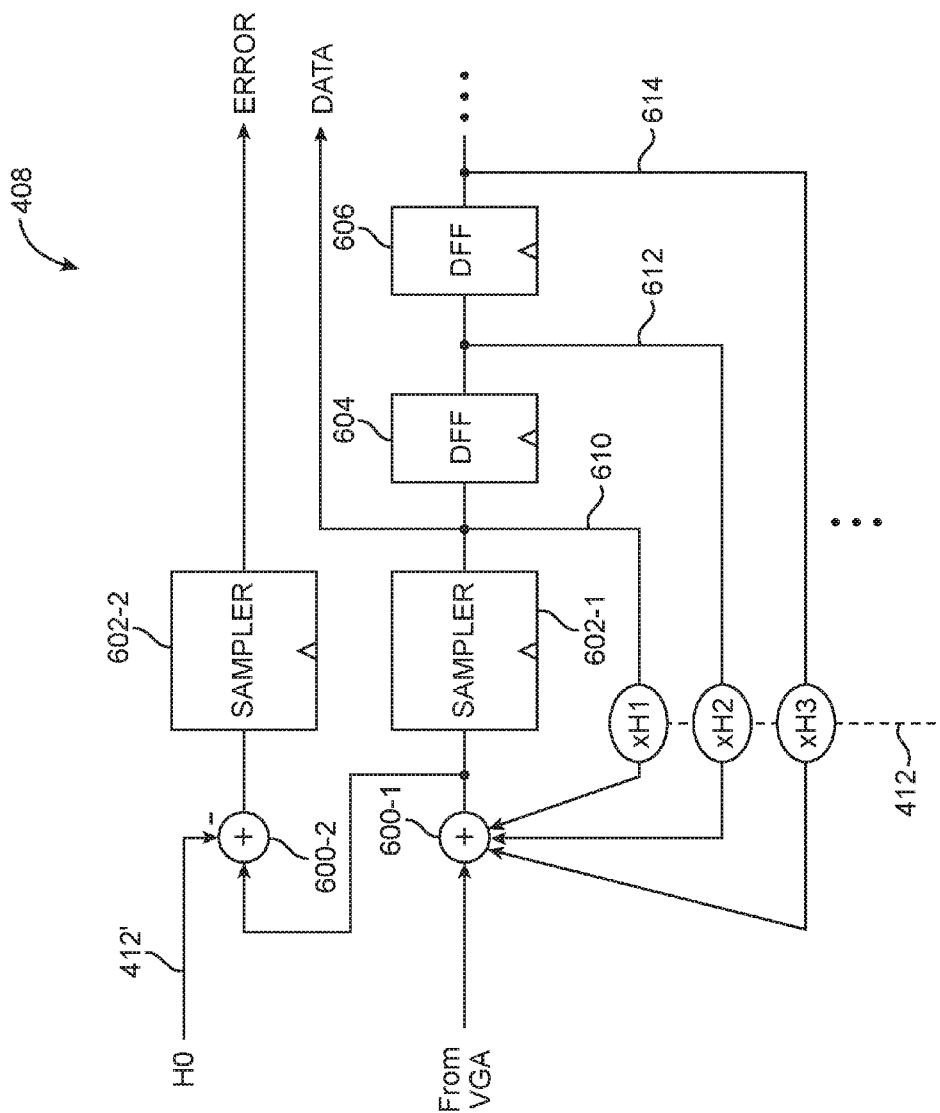
FIG. 6 is a diagram of an illustrative decision feedback equalizer (DFE) in accordance with an embodiment.

FIG. 6 is a diagram showing one suitable implementation of DFE circuit 408 in accordance with an embodiment. DFE circuit 408 may include a first DFE summation node circuit 600-1, a digital sampler circuit such as sampler 602-1, a first digital flip-flop (DFF) 604, and a second digital flip-flop 606. Summation node circuit 600-1 may have an input that receives an amplified analog signal from VGA 406 (FIG. 4), additional inputs that receive weighted versions of previously sampled values (sometimes referred to as delay tap data values or delay tap coefficients), and an output on which a summation node voltage is provided. The output of summation node circuit 600-1 is therefore sometimes referred to as the DFE summation node.

Sampler 602-1 (sometimes referred to as a digital "slicer") may serve as a high gain flip-flop or a comparator that converts the summation node voltage at the output of circuit 600-1, which is an analog signal, to its digital equivalent. The output of sampler 602-1 may serve as the output of DFE circuit 408 on which signal DATA is provided. Sampler 602-1, first DFF 604, and second DFF 606 may be coupled in series in the arrangement as shown in FIG. 6. Each of sampler 602-1, DFF 604, and DFF 606 may be controlled by the same clock signal. Coupled in this way, the data latched at the output of sampler 602-1 may represent data that was sampled by circuit 602-1 in a previous clock cycle (i.e., received data that has been delayed by one clock cycle or one "tap"); whereas the data latched at the output of DFF 604 may represent sampled data that has been delayed by two taps; and whereas the data latched at the output of DFF 606 may represent sampled data that has been delayed by three taps.

These delayed data signals may be fed back to the summation node circuit 600-1. In particular, the output of sampler 602- may be coupled to a first additional input of summation node circuit 600-1 via feedback path 610; the output of first DFF 604 may be coupled to a second additional input of summation node circuit 600-1 via feedback path 612; and the output of second DFF 606 may be coupled to a third additional input of summation node circuit 600-1 via feedback path 614. Each feedback signal may be weighted using corresponding tap weights received from adaptation logic 402 via path 412 (e.g., the first delay tap may be multiplied by H1; the second delay tap may be multiplied by H2; and the third delay tap may be multiplied by H3). These weighted delay tap values may be subtracted from the incoming signal using summation node 600-1. Connected in this way, the DFE circuit 408 of FIG. 6 represents a 3-tap full-rate decision feedback equalizer.

The example of FIG. 6 in which DFE circuit 408 includes three taps is merely illustrative and does not limit the scope of the present invention. In general, circuit 408 that is used as DFE circuit may include less than three taps or more than three taps and can be implemented using any desired linear equalization scheme, nonlinear equalization scheme, schemes that involve feedback and/or feed forward paths, etc.

Still referring to FIG. 6, DFE circuit 408 may include a second summation node circuit 600-2 connected in series with a second sampling circuit 602-2 (e.g., a second digital slicer). Summation node circuit 600-2 may have a first input that receives the summation node voltage from the output of summing circuit 600-1 and a second input that receives main cursor value H0 from adaptation logic 402 via path 412'. Summation node circuit 600-2 may generate a corresponding error signal by computing the difference between the input signal and the H0 main cursor value. The computed difference is latched using sampler 602-2.

Figure 7:
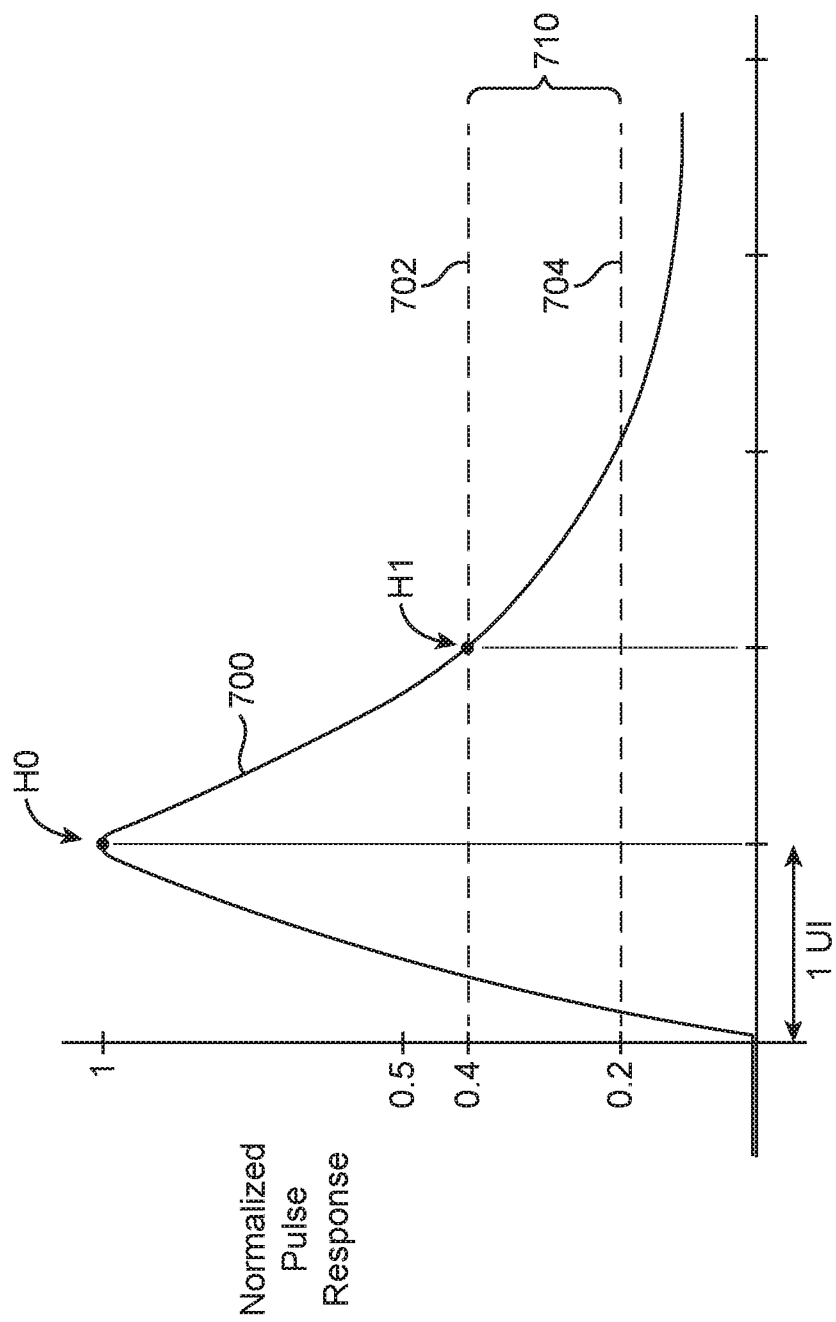
FIG. 7 is a diagram of a normalized pulse response showing a desired range within which the first post-cursor should be maintained in accordance with an embodiment.

To provide satisfactory continuous CTLE adaptation, it may be desirable to keep the ratio of H1 to H0 within a predetermined range. FIG. 7 is a diagram of a normalized pulse response 700, illustrating a desired range within which the first post-cursor should be maintained in accordance with an embodiment. As shown in FIG. 7, pulse response 700 may exhibit a main cursor with a normalized value of one and a first post-cursor value H1. In particular, it may be desirable to keep value H1 within a predetermined range 710 as delineated by dashed lines 702 and 704.

In the example of FIG. 7, line 702 sets an upper limit for range 710 (e.g., with an illustrative value of 0.4) while line 704 sets a lower limit for range 710 (e.g., with an illustrative value of 0.2). In response to post-cursor value exceeding upper limit 702 or falling below lower limit 704, the CTLE adaptation circuit may perform some corrective action to compensate for the deviation. As an example, the CTLE adaptation circuit may tune the CTLE code settings to adjust the gain and/or bandwidth of the CTLE circuit.

Range 710 sets a realistic and practical operating range for the CTLE circuit. If upper limit 702 is too high, the ISI may not be adequately mitigated. If upper limit 702 is too low, the CTLE circuit may be overly exerted. If lower limit 704 is too high, the CTLE circuit may be overly exerted. If the lower limit is too low, the lower limit may never been reached (e.g., the CTLE code may never count down). Range 710 as shown in FIG. 7 is merely illustrative and does not serve to limit the scope of the present invention. If desired, range 710 may be any desired fraction of the output range (e.g., upper limit 702 may be greater than or less than 0.4, and lower limit 704 may be greater than or less than 0.2).

Figure 8:
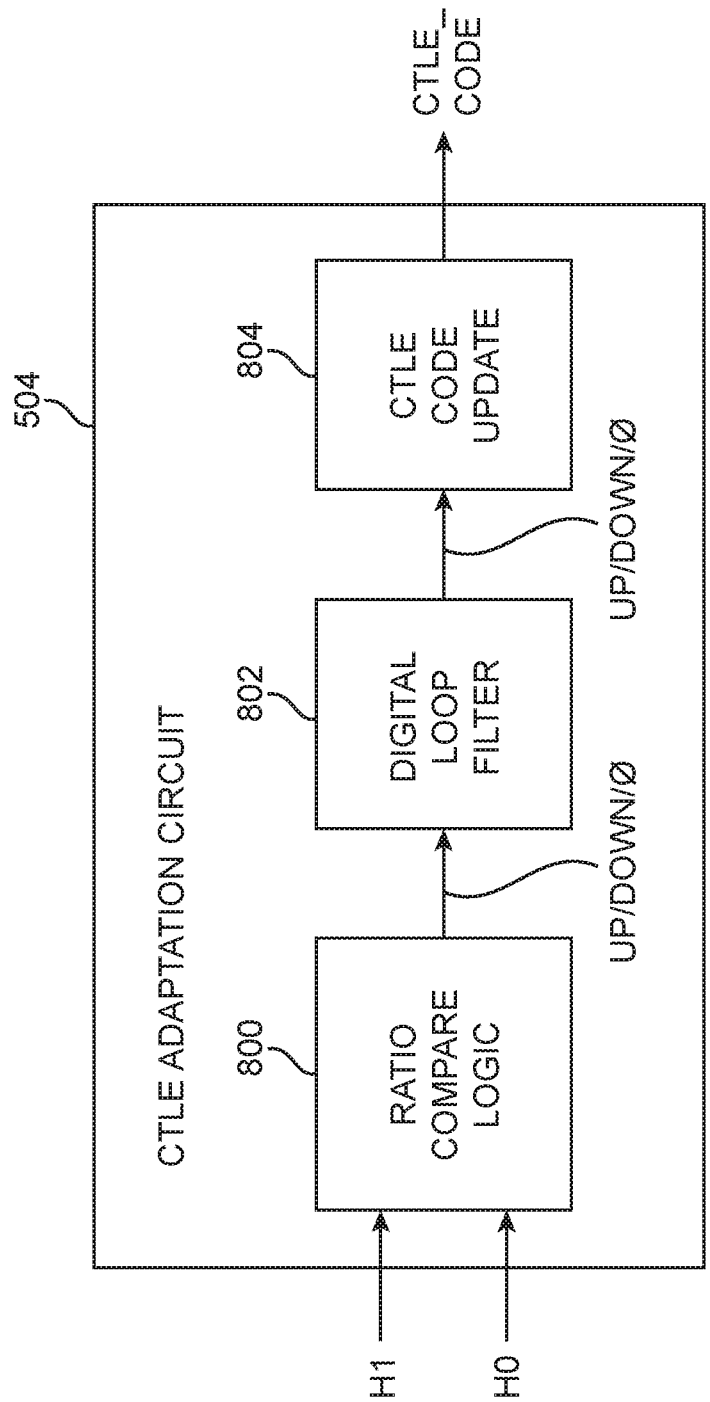
FIG. 8 is a diagram of an illustrative continuous time linear equalizer (CTLE) adaptation circuit in accordance with an embodiment.

FIG. 8 is a diagram of one suitable implementation of CTLE adaptation circuit 504 in accordance with an embodiment. As shown in FIG. 8, CTLE adaptation circuit 502 may include a comparison sub-circuit such as ratio compare logic 800, a filtering circuit such as digital loop filter 802, and a control circuit such as CTLE code updater 804. Ratio compare logic 800, digital loop filter 802, and CTLE code updater 804 may be connected in series.

Ratio compare logic 800 may receive first post-cursor value H1 from DFE error minimization adaptation circuit 500, main cursor value H0 from signal amplitude detection circuit 502, and compute the ratio of H1 to H0. The computed ratio (i.e., H1 divided by H0) may then be compared to preselected limits. If the computed ratio is greater than a preselected maximum value, logic 800 may output a logic "+1" signal that represents a count-up command. If the computed ratio is less than a preselected minimum value, logic 800 may instead output a logic "−1" signal that represents a count-down command. Logic 800 may otherwise output a logic "0" signal that represents a hold-current-count command.

The output of ratio compare logic 800 may be optionally passed through digital loop filter 802 to filter the count command to help prevent jitter issues. As an example, filter 802 may only let through a count-up command if it detects 10 consecutive cycles of "+1" at its input or may only let through a count-down command if it detects 10 consecutive cycles of "−1" at its input. As another example, filter 802 may only let through a count-up command if it detects five consecutive cycles of "+1" at its input and may only let through a count-down command if it detects five consecutive cycles of "−1" at its input. As yet another example, filter 802 may only let through a count-up command if it detects at least two consecutive cycles of "+1" at its input and may only let through a count-down command if it detects at least two consecutive cycles of "−1" at its input. Configured in this way, filter 802 can help prevent inadvertent and overly frequent triggering of count up or count down commands.

Still referring to FIG. 8, CTLE code updater 804 may receive the filtered command signals from digital loop filter 802. Based on the received command signals, code updater 804 may update signal CTLE_CODE, which directly controls the gain settings of CTLE circuit 404 (see, e.g., FIG. 4).

Figure 9:
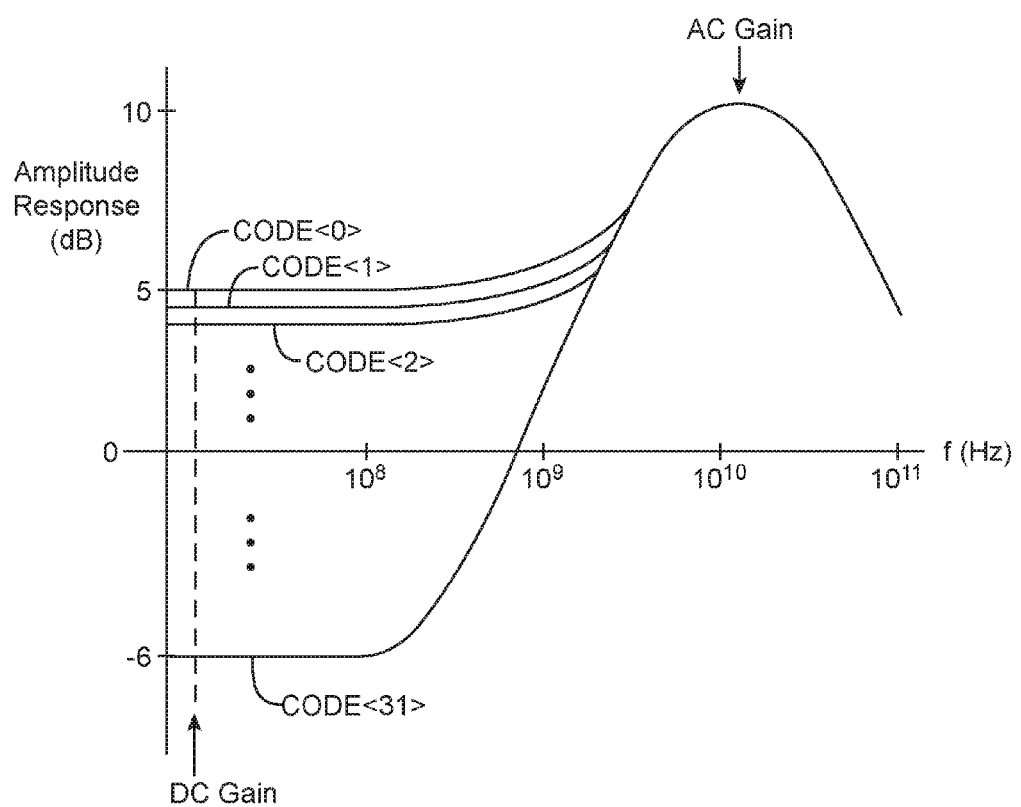
FIG. 9 is a plot showing the frequency response for different CTLE settings in accordance with an embodiment.

FIG. 9 is a plot showing the frequency response for different CTLE settings in accordance with an embodiment. As shown in FIG. 9, the different code settings may yield frequency response curves with different DC gains converging at a common AC gain. The difference between the AC gain value and the DC gain value may sometimes be referred to as the "peaking gain." The example of FIG. 9 shows thirty-two available CTLE code settings CODE<31:0>. In particular, CODE<0> may have the least peaking gain, whereas CODE<31> may exhibit the highest peaking gain. Thus, a count-up command will monotonically increase the peaking gain, whereas a down-down command will monotonically decrease the peaking gain. In general, a higher peaking gain will help reduce inter-symbol interference and therefore help push down the post-cursor values, whereas a lower peaking gain might allow more errors with the benefit of consuming less power.

Figure 10:
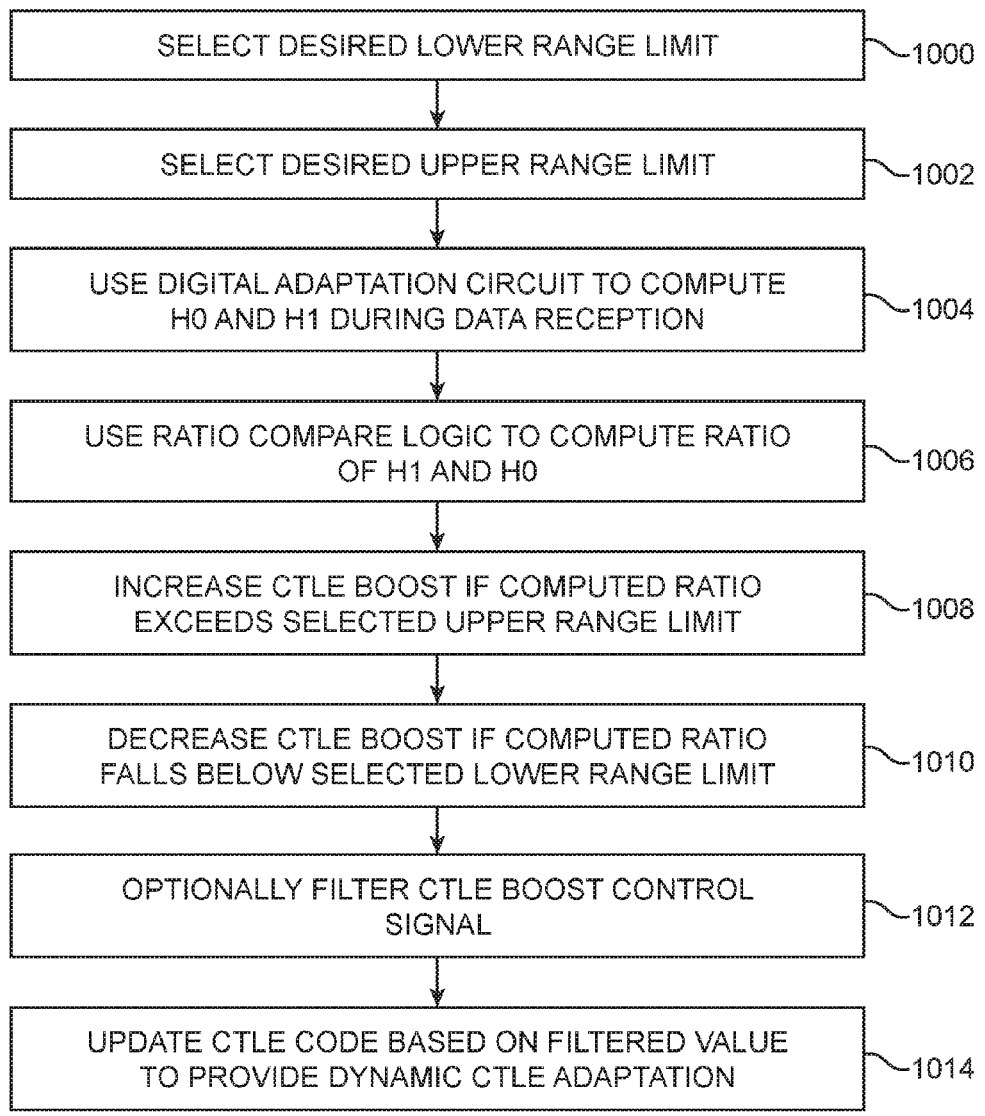
FIG. 10 is a flow chart of illustrative steps for operating the CTLE adaptation circuit of FIG. 8 in accordance with an embodiment.

FIG. 10 is a flow chart of illustrative steps for operating CTLE adaptation circuit 504 (see FIGS. 5-8) in accordance with an embodiment. At step 1000, a desired lower range limit may be selected (e.g., lower limit 704 in FIG. 7). At step 1002, a desired upper range limit may be selected (e.g., upper range limit 702 in FIG. 7). The selected upper and lower limits define a predetermined operating range for the CTLE circuit.

At step 1004, digital adaptation logic 402 may receive data and error input signals and generate values H0 and H1 during actual user data reception. In particular, DFE error minimization adaptation circuit 500 may be used to measure and output first post-cursor value H1 while signal amplitude detection circuit 502 may be used to measure and output main cursor value H0.

At step 1006, ratio compare logic 800 (FIG. 8) may be used to compute the ratio of H1 to H0 (i.e., H1/H0). In response to the computed ratio exceeding the upper range limit, the CTLE boost may be increased (e.g., by counting up the CTLE code) at step 1008. In response to the computed ratio falling below the lower range limit, the CTLE boost may be decreased (e.g., by counting down the CTLE code) at step 1010. As described in connection with FIG. 8, a filter circuit may optionally be used to filter the CTLE boost control signal (step 1012).

At step 1014, the CTLE code may be updated using circuit 804 to provide dynamic CTLE adaptation (e.g., by selecting among 32 or more available peaking gain settings to ensure that the computed ratio falls within the determined operating range). Performed in this way, the CTLE circuit can be continuously adaptive during normal user operation while effectively decoupling the CTLE adaptation from the DFE adaptation. In other words, both the CTLE and DFE adaptation may be adjusted simultaneously without interfering with one another. This method provides control over the main post-cursor (DFE tap) amplitude to help reduce DFE error propagation, which can also help improve clock data recovery (CDR) sampling time.

These steps are merely illustrative. The existing steps may be modified or omitted; some of the steps may be performed in parallel; additional steps may be added; and the order of certain steps may be reversed or altered. The embodiments above in which the ratio of H1 to H0 is computed is merely illustrative. If desired, the ratio of H0 to H1 (H0/H1) may instead be computed or other post-cursor values may also be factored in. The comparison thresholds may be adjusted accordingly to ensure proper function of the CTLE circuit (e.g., the upper and lower limits may be inverted, etc.).

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The foregoing is merely illustrative of the principles of this invention and various modifications can be made by those skilled in the art. The foregoing embodiments may be implemented individually or in any combination.

What is claimed is:

1. An integrated circuit, comprising:
a first equalizer circuit;
a second equalizer circuit that receives a signal from the first equalizer circuit; and
equalizer adaptation circuitry that adjusts the first equalizer circuit while the first and second equalizer circuits are receiving incoming signals for the integrated circuit, wherein the equalizer adaptation circuitry comprises a signal amplitude detection circuit that outputs a main cursor value for the received signal.

2. The integrated circuit of claim 1, wherein the first equalizer circuit comprises a continuous time linear equalizer.

3. The integrated circuit of claim 1, wherein the second equalizer circuit comprises a decision feedback equalizer.

4. The integrated circuit of claim 1, further comprising:
a variable gain amplifier interposed between the first equalizer circuit and the second equalizer circuit.

5. The integrated circuit of claim 1, wherein the equalizer adaptation circuitry further comprises:
an error minimization adaptation circuit that outputs post-cursor values for the received signal.

6. The integrated circuit of claim 5, wherein the equalizer adaptation circuitry further comprises:
an additional adaptation circuit that receives the main cursor value from the signal amplitude detection circuit and a selected one of post-cursor values from the error minimization adaptation circuit.

7. The integrated circuit of claim 6, wherein the additional adaptation circuit comprises:
ratio compare logic for computing a ratio between the main cursor value and the selected post-cursor value.

8. The integrated circuit of claim 7, wherein the additional adaptation circuit further comprises:
a code updater that controls a gain setting of the first equalizer circuit based on the computed ratio.

9. The integrated circuit of claim 8, wherein the additional adaptation circuit further comprises:
a filtering circuit interposed between the ratio compare logic and the code updater.

10. A method for operating an integrated circuit, comprising:
with an equalizer circuit, receiving a signal for the integrated circuit;
with an error minimization adaptation circuit, obtaining a post-cursor value for the received signal;
with a signal amplitude detection circuit, obtaining a main cursor value for the received signal; and
with an equalizer adaptation circuit, computing a ratio between the post-cursor value and the main cursor value.

11. The method of claim 10, further comprising:
comparing the computed ratio to an upper limit value and a lower limit value.

12. The method of claim 11, further comprising:
in response to determining that the computed ratio exceeds the upper limit value, using the equalizer adaptation circuit to adjust a gain setting of the equalizer circuit in a first direction; and
in response to determining that the computed ratio falls below the lower limit value, using the equalizer adaptation circuit to adjust the gain setting of the equalizer circuit in a second direction that is different than the first direction.

13. The method of claim 12, wherein adjusting the gain setting in the first direction comprises increasing a peaking gain of the equalizer circuit, and wherein adjusting the gain setting in the second direction comprises reducing the peaking gain of the equalizer circuit.

14. The method of claim 10, the equalizer circuit comprises a continuous time linear equalizer and a decision feedback equalizer, the method further comprising:
with the continuous time linear equalizer, outputting a partially equalized signal; and
with the decision feedback equalizer, receiving the partially equalized signal from the continuous time linear equalizer.

15. The method of claim 14, further comprising:
continuously adjusting both the continuous time linear equalizer and the decision feedback equalizer while the continuous time linear equalizer is receiving active user signals.

16. An integrated circuit die comprising:
a first equalizer;
a second equalizer that receives signals from the first equalizer; and
adaptation logic that continuously adjusts both the first equalizer and the second equalizer while the integrated circuit die is receiving active data, wherein the adaptation logic adjusts the first equalizer based on a first set of signals and adjusts the second equalizer based on a second set of signals that is different than the first set, and wherein the adaptation logic comprises a detection circuit that outputs main cursor values for the received signals.

17. The integrated circuit die of claim 16, wherein the first equalizer comprises a continuous time linear equalizer (CTLE), and wherein the second equalizer comprises a decision feedback equalizer.

18. The integrated circuit die of claim 17, wherein the adaptation logic further comprises:
an error minimization adaptation circuit that generates tap weights for controlling the second equalizer.

19. The integrated circuit die of claim 18, wherein the adaptation logic further comprises:
a CTLE adaptation circuit that receives the signal amplitude value and that receives only a subset of the tap weights.

20. The integrated circuit die of claim 19, wherein the CTLE adaptation circuit comprises:
circuitry that computes a ratio based on the signal amplitude value and the subset of tap weights, that compares the computed ratio to predetermined threshold values, and that adjusts the gain of the first equalizer based on the comparison.

* * * * *